(12) United States Patent
Totokawa et al.

(10) Patent No.: US 8,151,649 B2
(45) Date of Patent: Apr. 10, 2012

(54) PHYSICAL QUANTITY SENSOR DEVICE AND METHOD OF MANUFACTURING THE SAME

(75) Inventors: Masashi Totokawa, Nagoya (JP); Masao Naito, Nagoya (JP); Akihiro Takeichi, Aichi-ken (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 12/802,089

(22) Filed: May 28, 2010

(65) Prior Publication Data
US 2010/0307255 A1    Dec. 9, 2010

(30) Foreign Application Priority Data

Jun. 1, 2009 (JP) .................................. 2009-132465

(51) Int. Cl.
G01L 1/00 (2006.01)
G01L 1/22 (2006.01)
H01C 10/10 (2006.01)
H01C 11/00 (2006.01)

(52) U.S. Cl. ....... 73/777; 73/862.045; 73/774; 338/224; 338/223; 338/2; 338/47

(58) Field of Classification Search ............ 73/862.041–862.046; 338/2, 223, 224, 47
See application file for complete search history.

(56) References Cited

U.S. PATENT DOCUMENTS

| | | | | |
|---|---|---|---|---|
| 5,242,722 A * | 9/1993 | Hiraka et al. | ...................... | 338/2 |
| 7,164,342 B2 * | 1/2007 | Nakao et al. | ...................... | 338/47 |
| 7,224,257 B2 * | 5/2007 | Morikawa | ....................... | 338/47 |
| 7,397,340 B2 * | 7/2008 | Nakao et al. | ....................... | 338/2 |
| 2005/0103124 A1 | 5/2005 | Asai et al. | | |
| 2005/0140493 A1 | 6/2005 | Morikawa | | |
| 2006/0001521 A1 * | 1/2006 | Nakao et al. | ....................... | 338/2 |
| 2009/0013801 A1 | 1/2009 | Yamashita et al. | | |

FOREIGN PATENT DOCUMENTS

| | | |
|---|---|---|
| JP | 06-028916 | 2/1994 |
| JP | 2003-247898 | 9/2003 |
| JP | 2005-172793 | 6/2005 |
| JP | 2005-189106 | 7/2005 |
| JP | 2006-326477 | 12/2006 |
| JP | 2009-20061 | 1/2009 |

OTHER PUBLICATIONS

Gofuku et al. "Suface-modified RuO2 based thick film resistors using Nd:YAG laser". Journal of Applied Physics vol. 66, No. 12. (1989). Available Online <http://jap.aip.org/resource/1/japiau/v66/i12/p6126_s1>.*

Arshak et al. "Development of a novel thick-film strain gauge sensor system". Measurement Science and Technology, vol. 8, No. 1, Jan. 1, 1997. pp. 58-70. Available Online <http://iopscience.iop.org/0957-0233/8/1/009>.*

* cited by examiner

Primary Examiner — Lisa Caputo
Assistant Examiner — Jonathan Dunlap
(74) Attorney, Agent, or Firm — Harness, Dickey & Pierce, PLC (57) ABSTRACT

A physical quantity sensor device (10) having a structure in which a stress-sensitive body (1) of which the electric characteristics vary depending upon the application of stress and an insulator (2) having electric insulation are formed being closely adhered together, wherein the stress-sensitive body (1) comprises a thin glass film containing an electrically conductive element that is solidly dissolved therein as atoms, a method of manufacturing the physical quantity sensor device, a piezo-resistive film comprising a thin glass film containing ruthenium that is solidly dissolved therein as atoms, and a method of manufacturing the piezo-resistive film.

19 Claims, 6 Drawing Sheets

PHYSICAL QUANTITY SENSOR DEVICE AND METHOD OF MANUFACTURING THE SAME

TECHNICAL FIELD

This invention relates to a physical quantity sensor device for measuring physical change amounts, such as force, pressure, torque, velocity, acceleration, position, displacement, impact force, weight/mass, degree of vacuum, turning force, vibration, and noise, etc., and a method of manufacturing the physical quantity sensor device.

BACKGROUND ART

In order to measure physical change amounts, such as force, pressure, torque, velocity, acceleration, impact force, weight/mass, degree of vacuum, turning force, vibration, and noise, there has heretofore been proposed and put to practical use a physical quantity sensor device that uses a strain-sensitive resistor having characteristics, i.e., strain-sensitive characteristics, varying the electric resistance depending on a change in the quantity of strain. The strain-sensitive resistor that has been known comprises a matrix made of glass, i.e., a glass matrix, in which electrically conductive particles are dispersed.

In order to provide a physical quantity sensor device capable of highly sensitive measuring of a physical quantity maintaining high precision, for example, JP-A-2005-172793 discloses a physical quantity sensor device comprising a pressure-sensitive body which varies electric characteristics upon the application of stress, and electric insulators formed on each of the two opposing surfaces of the pressure-sensitive body integrally therewith, wherein the pressure-sensitive body comprises a matrix of glass in which electrically conductive particles are dispersed.

In order to provide a strain detector device having a strain resistive device that forms a highly stable electrically conductive path while suppressing fluctuation in the resistance when stress is exerted or removed, further, JP-A-2003-247898 discloses a strain detector device of which the strain resistive device is obtained by firing a resistor paste which chiefly comprises an electrically conductive component-containing glass containing electrically conductive particles in the glass frits.

In order to provide a physical quantity sensor elemental structure which facilitates electric connection to an external unit and makes it possible to form an electric connection portion that is free from being affected by the application of a large physical quantity, JP-A-2005-189106 discloses a physical quantity sensor elemental structure in which an insulator and a detector unit are laminated in a direction in which a physical quantity is applied, and the detector unit has an electric connection surface on the main surface thereof on the side that is closely adhered to the insulator, the electric connection surface being exposed without the insulator.

However, the above pressure-sensitive bodies have a gauge factor GF), which is the sensitivity index of not more than about 30, exhibiting good strain-sensitive characteristics as compared to the case of using a metal foil gauge that has a GF of not more than about 2, but are inferior to use of a silicon semiconductor having a FG of not larger than about 200. Therefore, in order to accurately detect the physical quantity without using a strain-causing body, the pressure-sensitive bodies, such as the above resistor bodies, lack sensitivity. In addition, the glass matrix that contains lead which places a burden on the environment.

In order to provide a physical quantity sensor device capable of attaining both the formation of a strain-sensitive resistor using a lead-free glass matrix and the expression of strain-sensitive characteristics at a level sufficient for practical use, JP-A-2005-189106 discloses a physical quantity sensor device of which the strain-sensitive resistor is obtained by dispersing electrically conductive particles in the matrix which does not contain lead, but contains bismuth. However, the physical quantity sensor device is still far from having highly sensitive strain-sensitive characteristics.

In order to provide a paste for forming a thick-film resistor that is used as a resistive device for hybrid ICs and thick-film chips, featuring low noise and excellent withstand voltage, and a treated glass frit for the paste, JP-A-6-028916 discloses a paste for forming a thick-film resistor, comprising a treated glass frit, a lead borosilicate glass frit and an organic vehicle, wherein the treated glass frit containing at least one of rhenium oxide, ruthenium oxide, iridium oxide, rhodium oxide, rhenium type pyrochlore, ruthenium type pyrochlore and iridium type pyrochlore in the form of clusters with a diameter of not more than 10 nm, penetrating and dispersed in the lead borosilicate glass particles.

However, the thick-film resistor used as a resistive device for hybrid ICs and thick-film chips is a material that gives importance to stabilizing the resistance and is, therefore, designed to minimize a change in the resistance caused by strain, i.e., caused by thermal stress due to a difference in the thermal expansion from that of the substrate, and thus cannot be used as the physical quantity sensor device.

In addition, concerning laser deposition, JP-A-2006-326477 proposes a method of manufacturing a catalyst for purifying exhaust gas, characterized by carrying a noble metal and a NOx-occluding material on a carrier oxide relying on a laser abrasion method, by using a target that contains a noble metal source, a NOx-occluding material source and a carrier oxide source, in an attempt to carry the NOx-occluding material in a more fine state, and carry the noble metal and the NOx-occluding material in an alternately and highly dispersed state.

SUMMARY OF INVENTIONS

The present invention was accomplished in view of the above problems and has an object of providing a physical quantity sensor device which is equipped with a highly sensitive strain-sensitive resistor without containing Pb, is small in size and is capable of measurement to a high load zone.

The present invention makes it possible to realize a highly sensitive, highly accurate and highly strong strain-sensitive resistor, by forming, in the form of a thin film, a portion that corresponds to the strain-sensitive portion in a conventional resistor. More preferably, the invention makes it possible to express strain-sensitive characteristics on a level sufficiently high enough for practical use, without using lead in the matrix material.

The physical quantity sensor device according to a first aspect of the present invention is a physical quantity sensor device (10) having a structure in which a stress-sensitive body (1) of which the electric characteristics vary depending upon the application of stress and an insulator (2) having electric insulation are formed being closely adhered together, wherein the stress-sensitive body (1) comprises a thin glass film containing an electrically conductive element that is solidly dissolved therein as atoms.

According to the first aspect, a portion corresponding to the strain-sensitive portion of the conventional resistor is formed like a thin film containing an electrically conductive element that is solidly dissolved therein as atoms to realize a highly sensitive, highly accurate and highly strong strain-sensitive resistor.

A preferred embodiment of the first aspect provides the physical quantity sensor device, wherein the thin glass film is formed to contain the electrically conductive element solidly dissolved therein as atoms by laser deposition using an oxide of the electrically conductive element.

According to this embodiment, the thin glass film is more reliably formed as a thin film containing the electrically conductive element solidly dissolved therein as atoms to realize the more highly sensitive, highly accurate and highly strong strain-sensitive resistor.

Another preferred embodiment of the first aspect provides the physical quantity sensor device, wherein the thin glass film contains the electrically conductive element solidly dissolved therein as atoms in a range of 1 to 60 atm %.

According to this embodiment, highly sensitive characteristics can be obtained and, besides, the strain-sensitive film can be formed by a simple process.

Another preferred embodiment of the first aspect provides the physical quantity sensor device, wherein the electrically conductive element is ruthenium. According to this embodiment, controlling the valency of the electrically conductive element in the glass is possible.

Another preferred embodiment of the first aspect provides the physical quantity sensor device, wherein the thin glass film contains a bismuth element at least in a range of 10 atm %.

According to this embodiment, controlling the valency of the electrically conductive element in the glass and maintaining the electrically conductive element in a stable state are possible.

Another preferred embodiment of the first aspect provides the physical quantity sensor device, wherein the thin glass film contains no lead. According to this embodiment, providing the highly sensitive and highly accurate physical quantity sensor device containing no substance that places a burden on the environment is possible.

Another preferred embodiment of the first aspect provides the physical quantity sensor device, wherein the laser deposition using the oxide of the electrically conductive element is a laser deposition using, as the target, a fired glass body in which are dispersed electrically conductive particles that contain the oxide of the electrically conductive element.

According to this embodiment, solidly dissolving the electrically conductive element in the glass and controlling the valency thereof are possible.

Another preferred embodiment of the first aspect provides the physical quantity sensor device, wherein the laser deposition using the oxide of the electrically conductive element is a laser deposition using, as separate targets, both the oxide of the electrically conductive element and the glass.

According to this embodiment, easily controlling the valency and amount of the electrically conductive element in the glass is possible.

Another preferred embodiment of the first aspect provides the physical quantity sensor device, wherein the laser deposition is a pulsed laser deposition. According to this embodiment, forming a homogeneous film of glass in which the electrically conductive element is solidly dissolved is possible.

Another preferred embodiment of the first aspect provides the physical quantity sensor device, wherein the stress-sensitive body (1) is laminated on the insulator (2) holding partly at least one of a pair of electrodes (3,3') provided on the insulator (2) therebetween, and a stress-receiving body (5) for receiving the application of stress is provided on at least part of the stress-sensitive body (1) holding, as required, a junction material layer (4) therebetween.

According to this embodiment, the load applied onto the pressure-receiving body can be sensed relying on the compressive force, and detection can be made up to a high load region.

Another preferred embodiment of the first aspect provides the physical quantity sensor device, wherein the stress-sensitive body (1) is a piezo-resistive film. According to this embodiment, the load applied onto the pressure-receiving body can be sensed relying on the compressive force, and detection can be made up to a high load region.

The method of manufacturing a physical quantity sensor device according to a second aspect of the present invention is a method of manufacturing a physical quantity sensor device by closely adhering a stress-sensitive body (1) of which the electric characteristics vary depending upon the application of stress to an insulator (2) having electric insulation to thereby form a physical quantity sensor device (10), comprising the step of forming a thin glass film containing an electrically conductive element solidly dissolved therein as atoms on the insulator (2), by a laser deposition method using a target (11) that contains an oxide of the electrically conductive element.

According to the second aspect, it is possible to deposit, on the insulator (2), a piezo-resistive film in which an electrically conductive element such as ruthenium element is solidly dissolved in the glass at an atomic level, and to produce the physical quantity sensor device equipped with a highly sensitive, highly accurate and highly strong strain-sensitive resistor.

A preferred embodiment of the second aspect provides the method of manufacturing the physical quantity sensor device, wherein a target containing a fired glass body in which there are dispersed electrically conductive particles containing the oxide of the electrically conductive element, is used as the target (11) that contains the oxide of the electrically conductive element.

According to this embodiment, it is further possible to produce the physical quantity sensor device by using the target that is produced by a simple process of screen-printing and firing, on a flat plate, a paste-like material of a mixture of a glass matrix containing, for example, a bismuth element and electrically conductive particles of a ruthenium oxide ($RuO_2$).

Another preferred embodiment of the second aspect provides the method of manufacturing the physical quantity sensor device, wherein a target (12) containing a glass is further used, in addition to the use of the target (11) that contains the oxide of the electrically conductive element.

According to this embodiment, the glass and the electrically conductive oxide can be separately controlled, i.e., the presence thereof can be arbitrarily controlled.

Another preferred embodiment of the second aspect provides the method of manufacturing the physical quantity sensor device, wherein the laser deposition method is a pulsed laser deposition method. According to this embodiment, the film is formed by sublimating the target, and therefore the target composition can be reflected in the film composition.

Another preferred embodiment of the second aspect provides the method of manufacturing the physical quantity sensor device, wherein the glass contains no lead. According to this embodiment, the highly sensitive and highly accurate physical quantity sensor device containing no substance that places a burden on the environment can be easily produced.

Another preferred embodiment of the second aspect provides the method of manufacturing the physical quantity sensor device, wherein the electrically conductive element is ruthenium. According to this embodiment, forming the piezo-resistive film in which ruthenium is solidly dissolved in the glass as atoms is possible.

The piezo-resistive film according to a third aspect of the present invention is a piezo-resistive film comprising a thin glass film containing ruthenium that is solidly dissolved therein as atoms. According to the third aspect, making the piezo-resistive film sensitive is possible, since it is possible to increase the content of ruthenium-oxygen bonding structures in which electrical conductivity differs at an applied stress, by using the thin glass film containing ruthenium that is solidly dissolved therein as atoms.

A preferred embodiment of the third aspect provides the piezo-resistive film, wherein the glass mainly contains a bismuth-type glass. According to this embodiment, adjusting a coefficient of thermal expansion of the film to one of a substrate, and improving adhesion with the substrate are possible.

Another preferred embodiment of the third aspect provides the piezo-resistive film according, wherein the thin glass film contains 2 atm % or more of ruthenium and 30 atm % or more of oxygen. According to this embodiment, adjusting electrical conductivity and piezo-resistive sensitivity of the film is possible.

The method of manufacturing a piezo-resistive film according to a fourth aspect of the present invention is a method of manufacturing a piezo-resistive film, comprising the step of forming a thin glass film containing ruthenium solidly dissolved therein as atoms on an insulator, by a pulsed laser deposition method using a target that contains an oxide of ruthenium. According to the fourth aspect, making compositions and structures in the film uniform is possible.

A preferred embodiment of the fourth aspect provides the method of manufacturing a piezo-resistive film, wherein a target containing a fired glass body in which there are dispersed electrically conductive particles containing the oxide of ruthenium is used as the target that contains the oxide of ruthenium. According to this embodiment, making structures in the film uniform without aggregation of ruthenium in the film is possible.

Another preferred embodiment of the fourth aspect provides the method of manufacturing a piezo-resistive film, wherein a target containing glass is further used, in addition to the use of the target that contains the oxide of ruthenium. According to this embodiment, forming independently structures of glass and structures in which ruthenium is solidly dissolved in glass in the film is possible.

Another preferred embodiment of the fourth aspect provides the method of manufacturing a piezo-resistive film, further comprising a step of annealing the thin glass film formed on the insulator at a temperature of 700° K or more. According to this embodiment, it is possible that oxygen elements coordinate to a ruthenium element, and electrical conductivity and piezo-resistive sensitivity of the film increase.

DETAILED DESCRIPTION

In the present invention, the word "stress" refers to physical change, such as force, pressure, torque, velocity, acceleration, impact force, weight/mass, degree of vacuum, turning force, vibration, and noise. More concretely, when applied to, for example, a part of an automobile (a sensor), "stress" refers to a physical change such as a pedal-depressing force, a tire-driving force or the like force.

In the invention, the "electric characteristics" that vary depending upon the application of stress, refer to electrical conductivity (resistance value) and the like. More concretely, characteristics (strain-sensitive characteristics) exhibiting electric resistance that vary depending on a change in the quantity of strain caused by, for example, pressure are used.

In the invention, the "insulator 2" having electric insulation has no particular limitation on the material or shape thereof, and concrete examples of the material include alumina, etc.

The "stress-sensitive body 1" used in the invention is provided in the physical quantity sensor device being closely adhered to the insulator 2 having electric insulation, and comprises a thin glass film containing an electrically conductive element solidly dissolved therein as atoms. The thin glass film has a thickness, preferably, from 0.05 to 20 μm, more preferably, 0.1 to 5 μm and, particularly preferably, 0.5 to 2 μm.

The phrase "solidly dissolved therein as atoms" stands for that the electrically conductive element is, usually, present as ions in the amorphous glass. As the "electrically conductive element", there is usually used ruthenium, rhenium, rhodium or titanium. Among them, ruthenium and rhenium are desired from the standpoint of electrical conductivity in relation to their amounts of addition, and ruthenium is particularly desired.

The solidly dissolved amount of the electrically conductive element constituting the thin glass film is in a range of, preferably, 1 to 60 atm %, more preferably, 1 to 30 atom % and, particularly preferably, 1 to 20 atm %. If the solidly dissolved amount of the electrically conductive element is less than 1 atm %, the electrical conductivity decreases, which is not desirable. If the solidly dissolved amount of the electrically conductive element is more than 60 atm %, on the other hand, the piezo-resistance coefficient (gauge factor) decreases, which is not desirable.

As the components for constituting the glass matrix of the thin glass film, bismuth, silicon, boron, calcium, zirconium and barium are normally used. Among them, it is desired to use bismuth, silicon and boron from the standpoint of attaining an amorphous state (a glassy state). Particularly, it is desired that bismuth is contained in combination with the above ruthenium. The content of bismuth in the thin glass film is, preferably, at least 5 atm %, more preferably, in a range of 15 to 70 atm % and, particularly preferably, in a range of 20 to 60 atm %. If the content of bismuth is not less than 70 μm, the coefficient of thermal expansion increases, which is not desirable.

It is, further desired that the thin glass film contains no lead so as to not place a burden on the environment.

As the thin glass film, there can be concretely exemplified a piezo-resistive film comprising bismuth borosilicate, as well as a calcium borosilicate glass.

In the invention, the "laser deposition method", usually, stands for a laser deposition method based on a laser sputtering method and, more concretely, stands for a laser deposition method of forming a predetermined thin glass film by applying, for example, a laser beam onto a target formed of an oxide of an electrically conductive element to sputter the target substance so as to be deposited on a substrate which is the insulator 2. There is no particular limitation on the laser and, usually, there is used such a laser as YAG laser or excimer laser. Conditions preferred for conducting the laser sputtering and the laser deposition comprises a pressure of, usually, not higher than $10^{-1}$ Pa and a temperature of, usually, 10 to 30° C.

Further, one preferred example of the target is a target of a one-part type, containing a fired glass body in which there are dispersed electrically conductive particles containing an oxide of the electrically conductive element. In this case, the target can be produced by a simple process of screen-printing and firing, on a flat plate, a paste-like material of a mixture of a glass matrix containing, for example, bismuth and electrically conductive particles of $RuO_2$. Though there is no particular limitation, the electrically conductive particles containing the oxide of electrically conductive element have a size or an average diameter, usually, in a range of about 1 nm to about 100 μm from the standpoint of laser absorption.

Another preferred example of the target is a two-part type in which a target containing a glass for a bismuth- or calcium-containing glass matrix is used, in addition to the use of the target that contains the oxide of the electrically conductive element. In this case, it is allowed to form a film in which is mixed a glass that contains the oxide and bismuth, by alternately applying a laser beam onto the target that contains the oxide of the electrically conductive element, and onto the target that contains the glass for the bismuth-containing glass matrix.

As the laser deposition method, it is desired to employ a pulsed laser deposition which applies the laser beam like a pulse onto the target, since it makes it possible to vaporize the glass containing the oxide and bismuth to thereby form a film without non-uniformity in the composition thereof.

When the piezo-resistive film in the invention comprises a thin glass film containing ruthenium that is solidly dissolved therein as atoms, the glass preferably contains mainly a bismuth-type glass, and is preferably bismuth borosilicate-type glass. The thin glass film preferably contains 2 atm % or more of ruthenium and 30 atm % or more of oxygen; more preferably contains ruthenium of from 2 to 30 atm %, oxygen of 30 atm % or more, and bismuth of from 5 to 40 atm %; and particularly preferably contains ruthenium of from 5 to 20 atm %, oxygen of from 40 to 60 atm %. In addition, as the rest, the thin glass film may contain Si, B, Zn and the like which are usually contained.

When the method of manufacturing a piezo-resistive film in the invention comprises the step of forming a thin glass film containing ruthenium solidly dissolved therein as atoms on an insulator, by a pulsed laser deposition method using a target that contains an oxide of ruthenium, it is preferred that a target containing a fired glass body in which there are dispersed electrically conductive particles containing the oxide of ruthenium is used as the target that contains the oxide of ruthenium, or that a target containing glass is further used, in addition to the use of the target that contains the oxide of ruthenium. It is preferred that containing a fired glass body in which there are dispersed electrically conductive particles containing the oxide of ruthenium is used as the target that contains the oxide of ruthenium, since piezo-resistive sensitivity can be easily obtained.

In addition, in the method of manufacturing a piezo-resistive film in the invention, it is preferred that the method further comprises a step of annealing the thin glass film formed on the insulator at a temperature of 700° K or more, in order to lower resistance values of the piezo-resistive film. The annealing temperature is usually at about a glass transition temperature of a glass used, and it is preferably from 700° K to 900° K in a case of a bismuth-type glass which is an example of an embodiment of the present invention. In addition, the annealing time is usually about 60 minutes in total, and a retention time at a maximum temperature is preferably about 10 minutes or less.

An embodiment of the physical quantity sensor device embodying the present invention will be further described with reference to the drawings. Numerals in parentheses described above represent correspondence to the concrete description in the embodiment described below.

Figure 1:
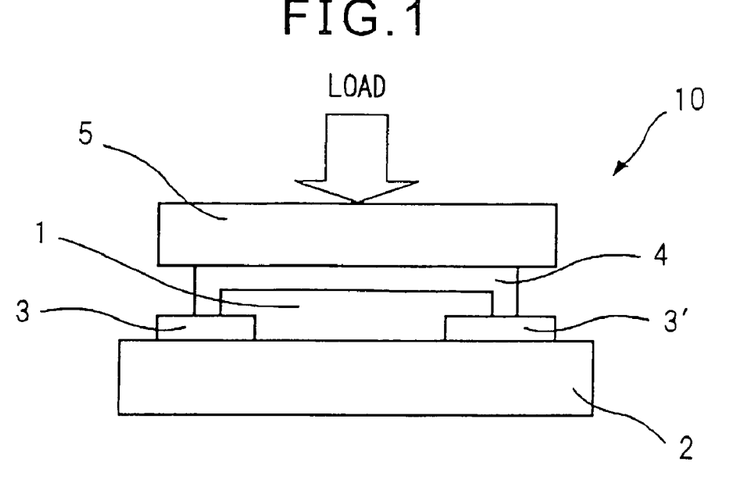
FIG. 1 shows a sectional view which schematically illustrates an embodiment of a physical quantity sensor device of the present invention.

FIG. 1 is a sectional view schematically illustrating one embodiment of a physical quantity sensor device 10, wherein a stress-sensitive body 1 which is, for example, a piezo-resistive film is laminated on an insulator 2 which comprises $Al_2O_3$ or the like, partly holding, at its both end portions, a pair of electrodes 3 and 3' comprising Au or the like, provided on the insulator 2 therebetween. In addition, the stress-sensitive body 1 is covered with a junction material layer 4. On the junction material layer 4 is, further, provided a stress-receiving body 5 comprising $Al_2O_3$ or the like to receive the application of stress which is the load.

If the load is applied onto the stress-receiving body 5 of the physical quantity sensor device 10, electric conduction takes place between the localized levels in the stress-sensitive body 1 which is the piezo-resistive film, a voltage occurs across the electrodes 3 and 3' due to a change in the electrical conductivity, and the physical quantity sensor device 10 works to highly sensitively and highly accurately detect the load applied thereon. The junction material layer 4 is to attain the junction between the pressure-receiving body and the resistor, and usually comprises a low-temperature softening glass, a resin or the like.

Figure 2:
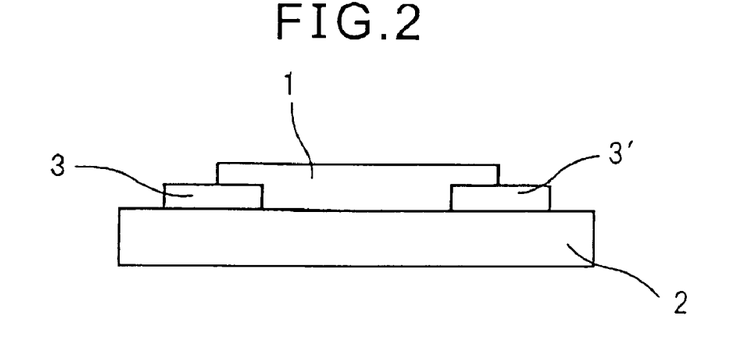
FIG. 2 shows a sectional view which schematically illustrates another embodiment of the physical quantity sensor of the present invention.

FIG. 2 is a sectional view partly and schematically illustrating another embodiment of the physical quantity sensor device 10. In the physical quantity sensor device, the stress-sensitive body 1 which is, for example, a piezo-resistive film is laminated on the insulator 2 which comprises $Al_2O_3$ or the like, partly holding, at its both end portions, the pair of electrodes 3 and 3' comprising Au or the like provided on the insulator 2 therebetween.

The physical quantity Sensor device may detect a change in the resistance of the piezo resistor either in the lengthwise direction thereof or in the direction of film thickness, making it possible to design the electrical conductivity of the film over a wide range.

Figure 3:
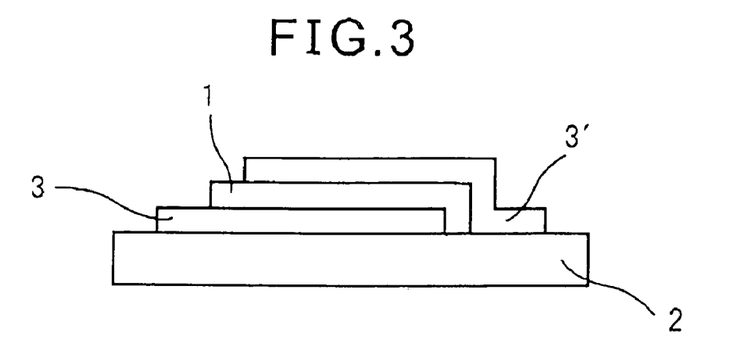
FIG. 3 shows a sectional view which schematically illustrates a further embodiment of the physical quantity sensor of the present invention.

FIG. 3 is a sectional view partly and schematically illustrating a further embodiment of the physical quantity sensor device 10. In the physical quantity sensor device, the stress-sensitive body 1 which is, for example, a piezo-resistive film is laminated on the insulator 2 which comprises $Al_2O_3$ or the like, holding, from its one end portion up to most of the region thereof, the electrode 3 comprising Au or the like provided on the insulator 2 therebetween, while the electrode 3' comprising Au or the like provided on the insulator 2 is in contact with the other end of the stress-sensitive body 1 and is partly covering the upper side of the stress-sensitive body 1.

Being constituted as described above, the physical quantity sensor device is capable of directly and highly sensitively detecting the load up to a large load region.

Figure 4:
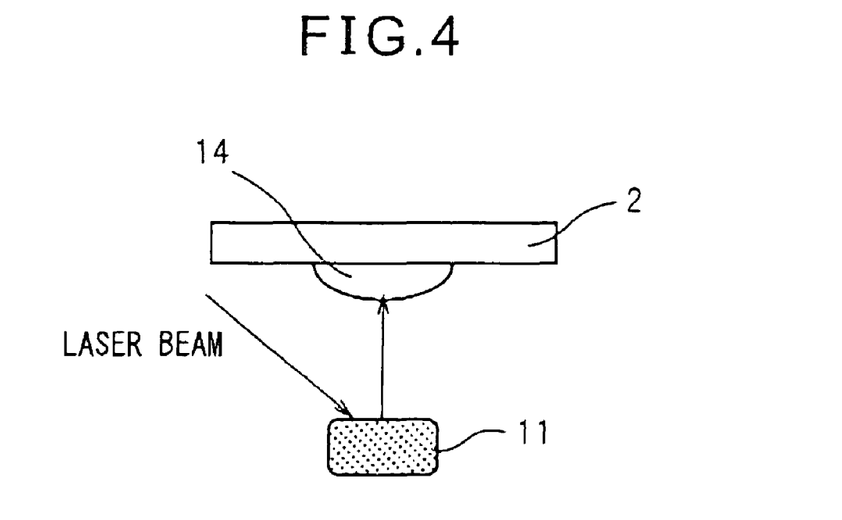
FIG. 4 shows a view which schematically illustrates an embodiment of a pulsed laser deposition method in a method of manufacturing the physical quantity sensor device of the present invention.

FIG. 4 is a view which Schematically illustrates one embodiment of a pulsed laser deposition method in the method of manufacturing the physical quantity sensor device. Illustrated here is a target of the one-part type. A pulse-like laser beam is applied from a laser beam source (not shown) onto a target 11 containing the oxide of the electrically Conductive element, i.e., onto the target containing a fired glass body comprising a composite obtained by dispersing electrically conductive particles containing an oxide of an electrically conductive element, such as ruthenium in a glass for glass matrix such as bismuth, so as to cause laser sputtering at the target 11. The electrically conductive element, ions of components in the glass matrix such as bismuth, neutral atoms and clusters thus generated are deposited by laser deposition on the surface of the insulator 2 comprising $Al_2O_3$ or the like to form the stress-sensitive body 14 such as piezo-resistive film.

The target 11 containing the oxide of the electrically conductive element used here is produced by a simple process of screen-printing and firing, on a flat plate, a paste-like material of a mixture of a glass matrix containing bismuth or the like and electrically conductive particles of an oxide of an electrically conductive element, such as $RuO_2$.

Figure 5:
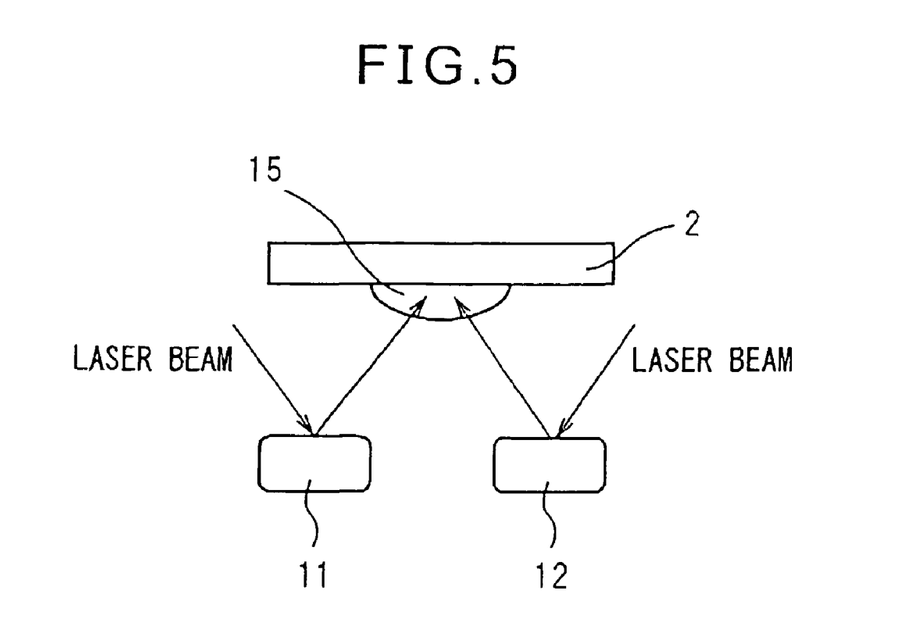
FIG. 5 shows a view which schematically illustrates another embodiment of the pulsed laser deposition method in the method of manufacturing the physical quantity sensor device of the present invention.

FIG. 5 schematically illustrates another embodiment of the pulsed laser deposition method in the method of manufacturing the physical quantity sensor device. Illustrated here are targets of the two-part type. A pulse-like laser beam is applied from a laser beam source (not shown) onto a target 11 containing the oxide of the electrically conductive element, i.e., onto the target comprising the oxide of the electrically conductive element such as ruthenium or the like, and onto a target 12 containing a glass, i.e., onto the target comprising a glass for a glass matrix such as bismuth, calcium or the like, so as to cause laser sputtering at both the target 11 and the target 12. In addition, the electrically conductive elements and glass-forming ions of components in the glass matrix such as bismuth are deposited by laser deposition on the surface of the insulator 2 comprising $Al_2O_3$ or the like to form the stress-sensitive body 15 such as piezo-resistive film.

In this case, the laser beam is alternately applied onto the target 11 containing the oxide of the electrically conductive element, and onto the target 12 containing the glass for glass matrix that contains bismuth or the like to vaporize the oxide and the glass containing bismuth to thereby form a film without non-uniformity in the composition thereof.

Figure 6:
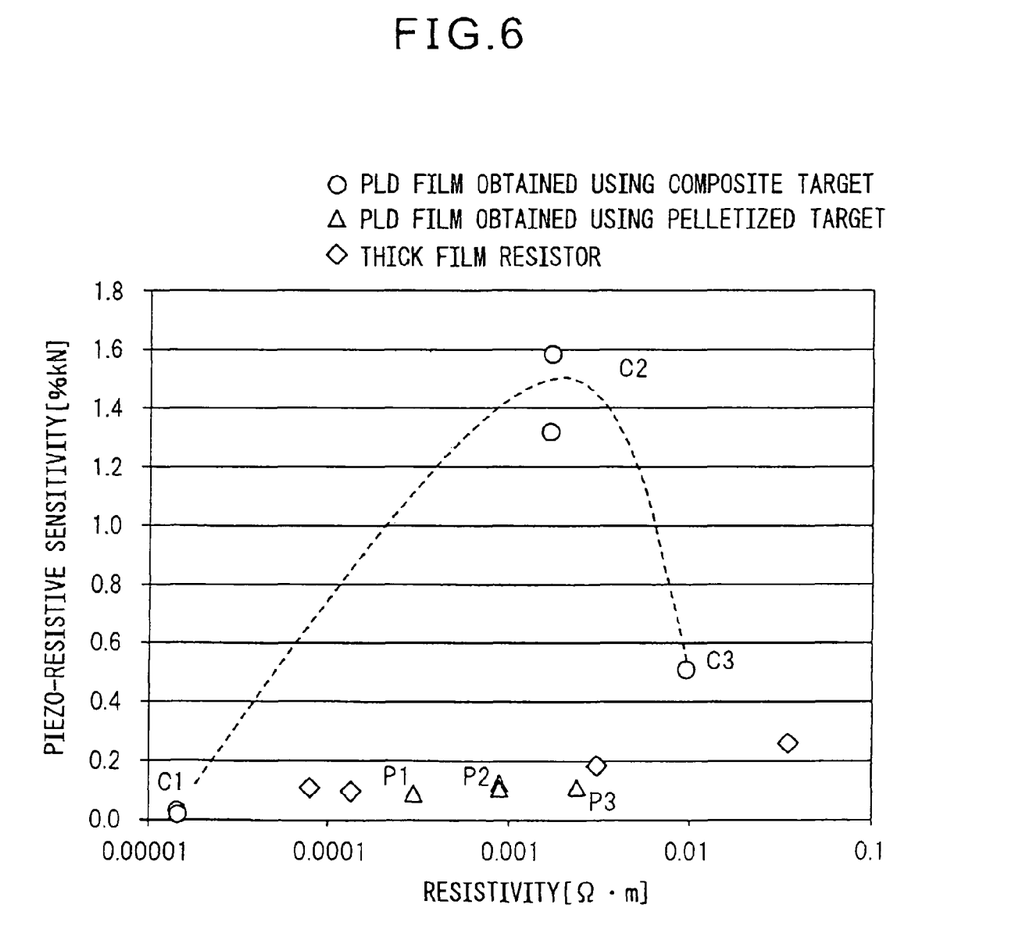
FIG. 6 shows a graph which illustrates the relationship between a resistivity and piezo-resistive sensitivity of thin glass films for a piezo-resistive film of the present invention, obtained by a pulsed laser deposition method.

FIG. 6 illustrates a relationship between a resistivity and piezo-resistive sensitivity, as piezo-resistive properties of each example of PLD films C1 to C3 obtained by using one-part type composite targets, PLD films P1 to P3 obtained by using two-part type pelletized targets, and thick film resistors.

Figure 7:
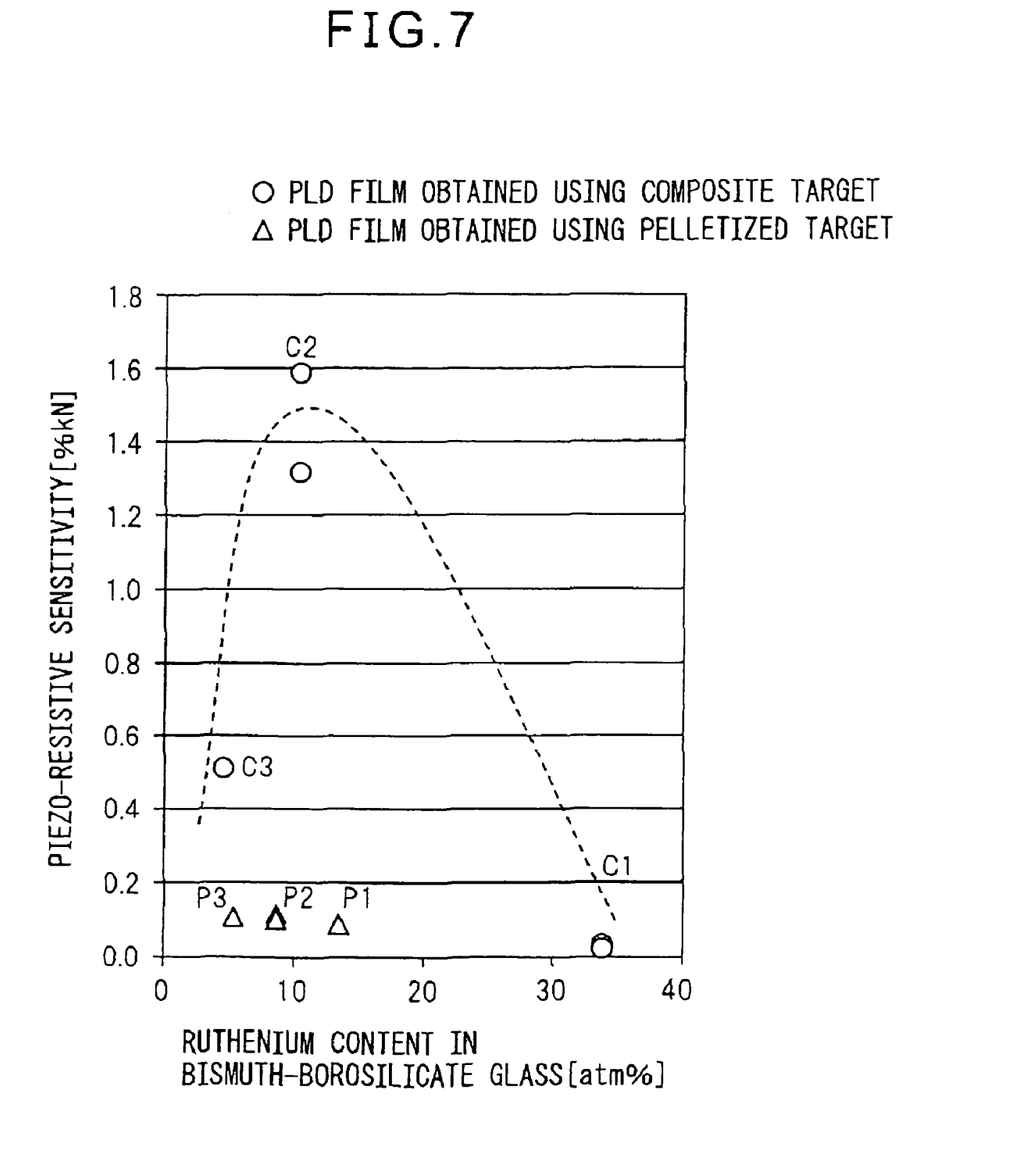
FIG. 7 shows a graph which illustrates the relationship between a ruthenium content and piezo-resistive sensitivity of thin glass films for a piezo-resistive film of the present invention, obtained by a pulsed laser deposition method.

FIG. 7 illustrates a relationship between a ruthenium content in a bismuth borosilicate-type glass, and piezo-resistive sensitivity, as piezo-resistive properties of each example of PLD films C1 to C3 obtained by using one-part type composite targets, and PLD films P1 to P3 obtained by using two-part type pelletized targets.

Figure 8:
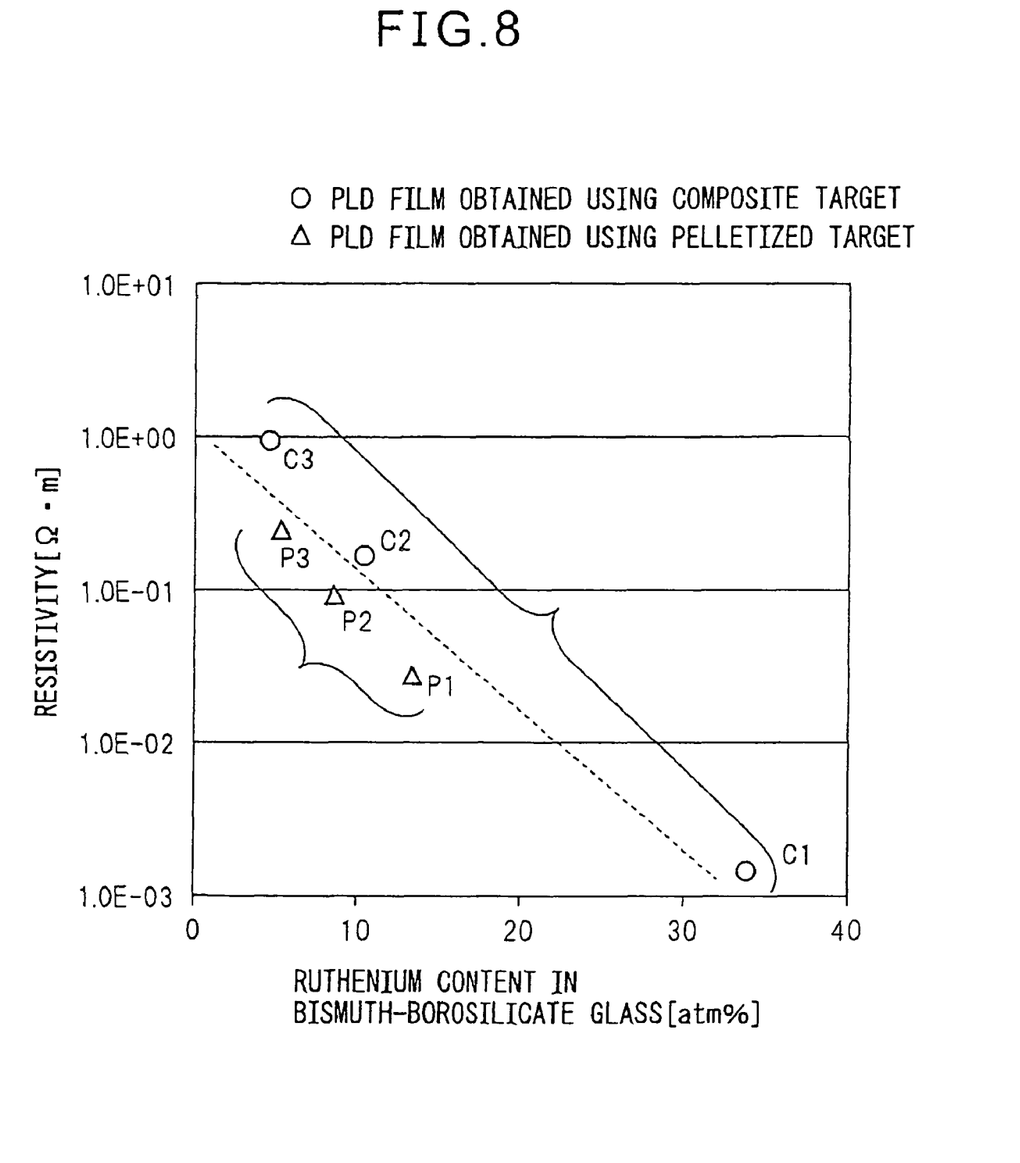
FIG. 8 shows a graph which illustrates the relationship between a ruthenium content and resistivity of thin glass films for a piezo-resistive film of the present invention, obtained by a pulsed laser deposition method.

FIG. 8 illustrates a relationship between a ruthenium content in a bismuth borosilicate-type glass, and resistivity, as piezo-resistive properties of each example of PLD films C1 to C3 obtained by using one-part type composite targets, and PLD films P1 to P3 obtained by using two-part type pelletized targets.

Figure 9:
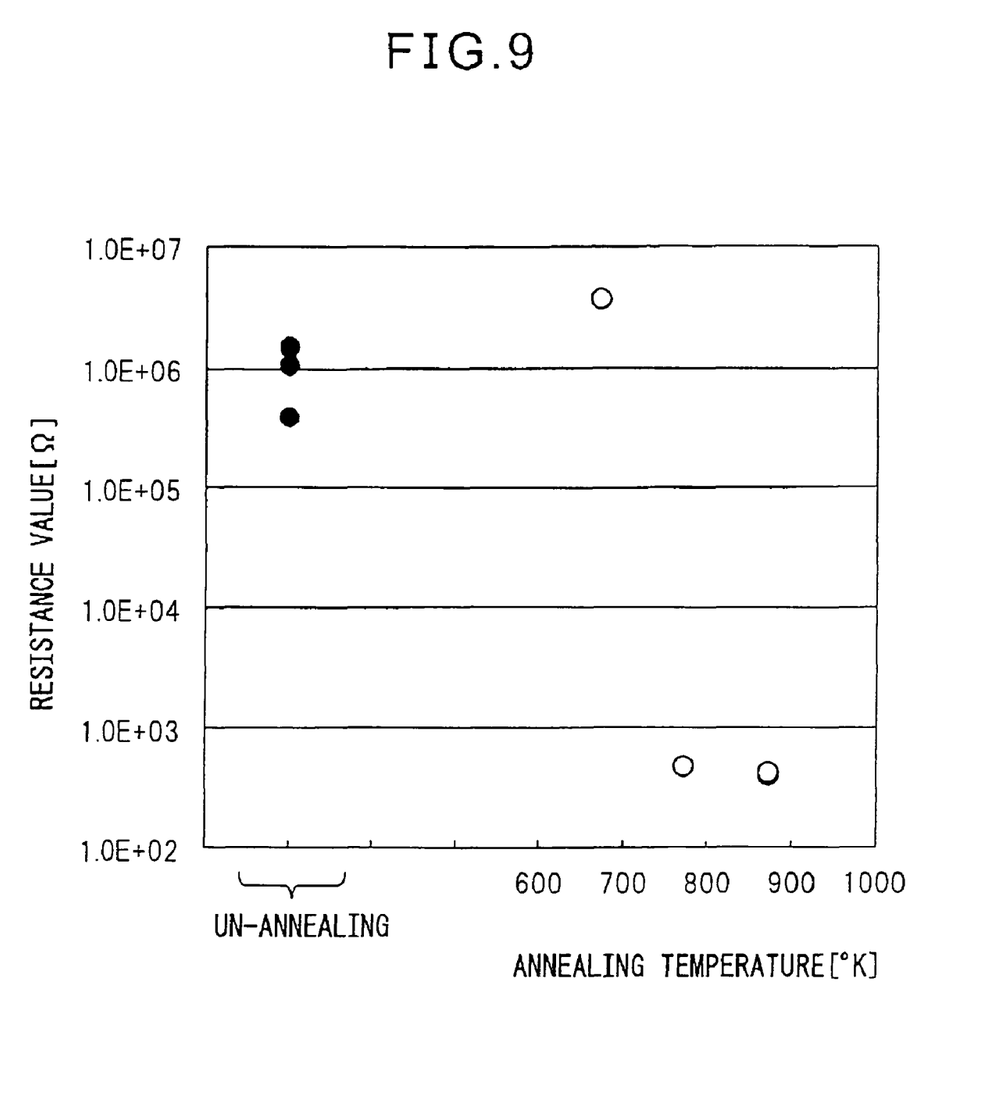
FIG. 9 shows a graph which illustrates the relationship between an annealing temperature and resistance value in an annealing treatment of thin glass films for a piezo-resistive film of the present invention, obtained by a pulsed laser deposition method.

FIG. 9 illustrates a relationship between an annealing temperature and resistance value of annealed PLD films as an effect of annealing of the PLD films obtained by using one-part type composite targets, along with resistance values of un-annealed PLD films.

EXAMPLES

The invention will be described more concretely by way of Examples of the present invention, however, the invention is in no way limited.

Examples 1 to 3

Referring to FIG. 2, Au electrodes 3 and 3' (about 0.02 mm thick) were formed at two places on an alumina substrate 2 (about 10 mm wide, about 15 mm long, about 2 mm thick) maintaining a distance of about 10 mm, by a screen-printing method.

A ruthenium oxide powder (specific surface area of about 5 $m^2$/g) as an oxide of an electrically conductive element; a bismuth-type glass powder (75 to 80 wt % of $Bi_2O_3$, 5 to 10 wt % of $B_2O_3$, not more than 10 wt % of ZnO, not more than 5 wt % of $SiO_2$), and an organic vehicle chiefly comprising ethyl cellulose and terpineol, were mixed and dispersed together at ratios shown in Table 1, by using a kneader such as three-roll mill to obtain pastes thereof, which were printed maintaining a thickness of about 20 μm by the screen-printing method on the alumina substrates (about 100 mm wide, about 100 mm long, about 1 mm thick), followed by firing at about 600° C. for about 10 minutes to form one-part type composite targets. In addition, the amounts of Ru in the targets were adjusted as shown in Table 1 by using the pastes containing the ruthenium oxide and the bismuth type glass at ratios adjusted as shown in Table 1.

As schematically shown in FIG. 4, the thus formed target 11 and the alumina substrate 2 on which the Au electrodes 3, 3' have been formed were set at predetermined positions in a chamber for forming a film by pulsed laser deposition, and the pulsed laser deposition was conducted. The conditions for the pulsed laser deposition were third higher harmonic (wavelength of 355 nm) of an Nd-YAG laser, energy of 470 mJ/shot, a recurring frequency of 10 Hz, a pulse width of 8 ns, a laser irradiation time of 2 minutes on the circumference of one target, which were repeated 8 times to 16 times. Referring to FIG. 2, the film formed on the alumina substrate 2 by pulsed laser deposition was annealed in the air atmosphere at about 600° C. to form a piezo-resistive film that served as the stress-sensitive body 1. Next, as shown in FIG. 1, an adhesive layer (about 1 mm thick) serving as the junction material layer 4 comprising, for example, an epoxy resin was so formed as to surround the piezo-resistive film. Thereafter, the upper pressure-receiving body 5 (about 2 mm thick) serving as the stress-receiving body and comprising alumina was formed thereon to obtain the physical quantity sensor device 10.

The piezo-resistive film of the thus obtained physical quantity sensor device 10 was measured for its compositions, at ten points by the TEM-EDS (transmission electron microscope—energy dispersive spectroscopy) to obtain the ranges of the PA amount and the Bi amount as shown in Table 1, and was measured by the XPS (X-ray photoelectron spectroscopy) to confirm that Ru was present as solid solution, and was evaluated for its current and voltage characteristics to obtain a resistivity of the piezo-resistive film as shown in Table 1. Further, a load of 5 kN or 15 kN was applied onto the upper pressure-receiving body 5 of the physical quantity sensor device 10 to measure the resistance value of the piezo-resistive film before and after the application as area resistance values. Changes in the resistance values after the application from the resistance values before the application are shown in Table 1 as load sensitivities of the sensors.

TABLE 1

| No. | | | Example 1 | Example 2 | Example 3 |
|---|---|---|---|---|---|
| Target film-forming condition (composite film) | Components | Ruthenium oxide (wt. pts.) | 40 | 30 | 20 |
| | | Bismuth type glass powder (wt. pts.) | 50 | 60 | 70 |
| | | Organic vehicle (wt. pts.) | 10 | 10 | 10 |
| Piezo-resistive film properties | Composition | Ru amount (atom %) | 31-35 | 5-15 | 3-6 |
| | | Bi amount (atom %) | 6-10 | 8-15 | 5-20 |
| | Resistance value | Area resistance ($\Omega/\square$) | 15 | 286 | 1100 |
| | Sensor sensitivity | Sensitivity to 5 kN(%) | −3.0 | −7.6 | −7.1 |
| | | Sensitivity to 15 kN(%) | −5.3 | −15.9 | −16.4 |

Examples 4 to 6

A ruthenium oxide powder (specific surface area of about 5 m$^2$/g) as an oxide of an electrically conductive element was cold-press-molded into pellets (about 10 mm in diameter, about 2 mm thick) by using a molding machine by applying a pressure of 1 to 2 tons/cm$^2$, followed by firing at about 1000° C. for about 60 minutes to obtain a pelletized sintered body of the ruthenium oxide. On the other hand, a bismuth-type glass powder (75 to 80 wt % of $Bi_2O_3$, 5 to 10 wt % of $B_2O_3$, not more than 10 wt % of ZnO, not more than 5 wt % of $SiO_2$) was cold-press-molded into pellets (about 10 mm in diameter, about 2 mm thick) by using a molding machine by applying a pressure of 1 to 2 tons/cm$^2$, followed by firing at about 500° C. for about 10 minutes to obtain a pelletized sintered body of the bismuth-type glass. The pelletized sintered body of the ruthenium oxide and the pelletized sintered body of the bismuth-type glass were set at predetermined positions in the chamber for forming a film by pulsed laser deposition, and a laser beam was applied thereto alternately to use them as targets of the two-part type. In addition, the amounts of Ru in the targets were adjusted as shown in Table 2, by adjusting the targets of the pelletized sintered body of ruthenium oxide and of the bismuth-type glass as shown in Table 2.

As schematically shown in FIG. 5, the thus formed two-part type targets 11, 12 and the alumina substrate on which the Au electrodes 3, 3' have been formed as obtained in the same manner as Example 1 were set at predetermined positions in the chamber for forming a film by pulsed laser deposition, and the two-part type pulsed laser deposition was conducted by applying the laser beam onto the targets 11 and 12 alternately. The conditions for the two-part type pulsed laser deposition consisted of third higher harmonics (wavelength of 355 nm) of the Nd-YAG laser, energy of 470 mJ/shot, a recurring frequency of 10 Hz, a pulse width of 8 ns, a laser irradiation time of 2 minutes on the circumference of each target, which were repeated 8 times to 16 times. To alternately apply the laser beam onto the targets 11 and 12, the targets 11 and 12 were disposed neighboring each other and were revolved so as to be alternately irradiated with the laser beam. As for the ratio, the center positions of revolution were deviated to vary the ratio of times for irradiating the targets 11 and 12. As shown in FIG. 2, the film formed on the alumina substrate 2 by pulsed laser deposition was annealed in the air atmosphere at about 600° C. to form a piezo-resistive film that served as the stress-sensitive body 1. Next, as shown in FIG. 1, an adhesive layer (about 1 mm thick) serving as the junction material layer 4 comprising an epoxy resin was so formed as to surround the piezo-resistive film. Thereafter, the upper pressure-receiving body 5 (about 2 mm thick) serving as the stress-receiving body and comprising alumina was formed thereon to obtain the physical quantity sensor device 10.

The piezo-resistive film of the thus obtained physical quantity sensor device 10 was measured for its composition by the TEM-EDS (transmission electron microscope—energy dispersive spectroscopy) to obtain the Ru amount and the Bi amount as shown in Table 2, and was measured by the XPS (photoelectron spectroscopy) to confirm that Ru was present as a solid solution, and was evaluated for its current and voltage characteristics to obtain a resistivity of the piezo-resistive film as shown in Table 2. Further, a load of 5 kN or 15 kN was applied onto the upper pressure-receiving body 5 of the physical quantity sensor device 10 to measure the resistance value of the piezo-resistive film before and after the application as area resistance values. Changes in the resistance values after the application from the resistance values before the application are shown in Table 2 as load sensitivities of the sensors.

TABLE 2

| No. | | | Example 4 | Example 5 | Example 6 |
|---|---|---|---|---|---|
| Target film-forming condition (pellet) | Components (ratios of laser beam radiations) | Ruthenium oxide (%.) | 15 | 20 | 30 |
| | | Bismuth type glass powder (%.) | 85 | 80 | 70 |
| Piezo-resistive film properties | Composition | Ru amount (atom %) | 5-8 | 8-11 | 11-16 |
| | | Bi amount (atom %) | 27-37 | 28-37 | 23-33 |
| | Resistance value | Area resistance ($\Omega/\square$) | 22528 | 4501 | 3108 |
| | Sensor sensitivity | Sensitivity to 5 kN(%) | −7.5 | −8.0 | 7.5 |
| | | Sensitivity to 15 kN(%) | −14.9 | −15.5 | −14.9 |

Comparative Example 1

A piezo-resistive film shown in FIG. 2 was formed by a conventional film-forming method. In other words, onto the alumina substrate 2 on which the Au electrodes 3, 3' have been formed as obtained in the same manner as in Example 1, a paste obtained by dispersing the ruthenium oxide and the glass powder in the organic vehicle as described in Example 1 was formed in a patterned manner by the screen-printing method, dried at 150° C. for 10 minutes, and was fired at 600° C. for 10 minutes to form a piezo-resistive film (about 0.02 mm thick) which was the so-called thick film resistor. In the same manner as in Example 1, further, the adhesive layer (about 1 mm thick) comprising the epoxy resin was formed thereon so as to surround the piezo-resistive film and, further, the upper pressure-receiving body (about 2 mm thick) which was the stress-receiving body comprising alumina was formed thereon to obtain a physical quantity sensor device.

The thus obtained physical quantity sensor device was measured in the same manner as in Example 1, and it was confirmed that Ru was present in the physical quantity sensor device almost in the form of particles.

Further, the physical quantity sensor device was evaluated for its current and voltage characteristics to find the resistivity of the piezo-resistive film, i.e., the area resistance value of 1 to 1 MΩ/□. Further, a load of 5 kN or 15 kN was applied onto the upper pressure-receiving body 5 of the physical quantity sensor device to measure the resistance value of the piezo-resistive film before and After the application as area resistance values. Changes in the resistance values after the application from the resistance values before the application were found to be −2% with the load of 5 kN, and −4% with the load of 15 kN, respectively.

As described in Examples 1 to 3, upon varying the amount of ruthenium in the composite target, it is made possible to vary the amount of ruthenium in the film formed by pulsed laser deposition and, therefore, to adjust the resistivity of the film. Further, the physical quantity sensor device is four or more times as sensitive as the conventional thick film resistors, presumably due to the feature of the present invention, i.e., ruthenium is solidly dissolved in the glass. If the amount of ruthenium is large (more than 30%) in the piezo-resistive film, the sensor sensitivity is not greatly improved, presumably due to their not being sufficient oxygen ions for ruthenium ions in the film, and metallic electric conduction of ruthenium is strongly affected.

As described in Examples 4 to 6, further, in the two-part type pulsed laser deposition, the alternate applications of the laser beam onto the targets of pellets and the ratio thereof were varied to thereby control the amount of ruthenium solidly dissolved in the obtained piezo-resistive films and the resistivity of the films. In addition, the sensor sensitivities became three or more times as high as those of the conventional thick film resistors.

Examples 7 to 12

Pulsed laser deposition (PLD) films C1, C2 and C3 (Examples 10, 11 and 12), which were respectively obtained in Examples 1, 2 and 3 by forming a film by a pulsed laser deposition method using the one-part type composite target, and PLD-films P1, P2 and P3 (Examples 7, 8 and 9), which were respectively obtained in Examples 6, 5 and 4 by forming a film by a pulsed laser deposition method using the two-part type pelletized target, were further evaluated by the following measurements. In addition, the average values of the measured compositions, which were obtained by measuring at ten points of each of PLD films C1 to C3 (Examples 10, 11 and 12) corresponding to Examples 1, 2 and 2, and PLD films P1 to P3 (Examples 7, 8 and 91 corresponding to Examples 6, 5 and 4 are shown in Table 3.

TABLE 3

| No. | Target | Film No. | Film composition (after annealing at 600° C.) [atm %] | | | | |
|---|---|---|---|---|---|---|---|
| | | | O | Ru | Bi | Si | Others |
| Example 7 | pellet | P1 | 44.2 | 13.4 | 29 | 2.0 | 11.3 |
| Example 8 | pellet | P2 | 43.3 | 8.7 | 33.9 | 2.5 | 11.7 |
| Example 9 | pellet | P3 | 46.8 | 5.4 | 33.9 | 2.7 | 11.3 |
| Example 10 | composite | C1 | 47.7 | 33.9 | 8.6 | 4.1 | 5.7 |
| Example 11 | composite | C2 | 59.3 | 10.4 | 11.1 | 14.0 | 5.2 |
| Example 12 | composite | C3 | 63.8 | 4.6 | 9.8 | 19.1 | 2.7 |

The relationship between the resistivity obtained by evaluating its current and voltage characteristics, and the piezo-resistive sensitivity obtained by measuring changes in the resistance values per stress applied to the structure described in FIG. 1 is shown in FIG. 6, as piezo-resistive properties of PLD films C1 to C3 and PLD films P1 to P3, along with the examples of the thick film resistors obtained in Comparative Example 1. Further, the relationship between the ruthenium content in a bismuth borosilicate-type glass and the piezo-resistive sensitivity is shown in FIG. 7, as piezo-resistive properties of PLD films C1 to C3 and PLD films P1 to P3. Further, the relationship between the ruthenium content in bismuth borosilicate-type glass and the resistivity is shown in FIG. 8, as piezo-resistive properties of PLD films C1-C3 and PLD films P1-P3. In addition, the relationship between the annealing temperature and the resistance value of the annealed PLD films is shown in FIG. 9, as an effect of annealing of PLD films, along with resistance values of the un-annealed PLD films.

We claim:

1. A physical quantity sensor device having a structure in which a stress-sensitive body of which the electric characteristics vary depending upon the application of stress, and an insulator having electric insulation are formed being closely adhered together, wherein said stress-sensitive body comprises a thin glass film containing an electrically conductive element that is solidly dissolved therein as atoms;

said thin glass film is formed to contain the electrically conductive element solidly dissolved therein as atoms, by a laser deposition using an oxide of said electrically conductive element; and the laser deposition using the oxide of said electrically conductive element is a laser deposition using, as separate targets, both the oxide of said electrically conductive element and the glass.

2. The physical quantity sensor device according to claim 1, wherein said thin glass film contains said electrically conductive element solidly dissolved therein as atoms in a range of 1 to 60 atm %.

3. The physical quantity sensor device according to claim 1, wherein said electrically conductive element is ruthenium.

4. The physical quantity sensor device according to claim 1, wherein said thin glass film contains a bismuth element at least in a range of 10 atm %.

5. The physical quantity sensor device according to claim 1, wherein said thin glass film contains no lead.

6. The physical quantity sensor device according to claim 1, wherein the laser deposition using the oxide of said electrically conductive element is a laser deposition using, as the target, a fired glass body in which are dispersed electrically conductive particles that contain the oxide of said electrically conductive element.

7. The physical quantity sensor device according to claim 1, wherein said laser deposition is a pulsed laser deposition.

8. The physical quantity sensor device according to claim 1, wherein said stress-sensitive body is laminated on said insulator holding partly at least one of a pair of electrodes provided on said insulator therebetween, and a stress-receiving body for receiving the application of stress is provided on at least part of said stress-sensitive body holding, as required, a junction material layer therebetween.

9. The physical quantity sensor device according to claim 1, wherein said stress-sensitive body is a piezo-resistive film.

10. A method of manufacturing a physical quantity sensor device by closely adhering a stress-sensitive body of which the electric characteristics vary depending upon the application of stress to an insulator having electric insulation to thereby form a physical quantity sensor device, comprising forming a thin glass film containing an electrically conductive element solidly dissolved therein as atoms on said insulator, by a laser deposition method using a target that contains an oxide of said electrically conductive element; wherein target containing glass is further used, in addition to the use of the target that contains the oxide of said electrically conductive element.

11. The method of manufacturing the physical quantity sensor device according to claim 10, wherein a target containing a fired glass body in which there are dispersed electrically conductive particles containing the oxide of said electrically conductive element, is used as the target that contains the oxide of said electrically conductive element.

12. The method of manufacturing the physical quantity sensor device according to claim 11, wherein said glass contains no lead.

13. The method of manufacturing the physical quantity sensor device according to claim 10, wherein said laser deposition method is a pulsed laser deposition method.

14. The method of manufacturing the physical quantity sensor device according to claim 10, wherein said electrically conductive element is ruthenium.

15. A piezo-resistive film comprising a thin glass film containing ruthenium that is solidly dissolved therein as atoms; wherein said thin glass film contains 2 atm % or more of ruthenium and 30 atm % or more of oxygen.

16. The piezo-resistive film according to claim 15, wherein said glass mainly contains bismuth-type glass.

17. A method of manufacturing a piezo-resistive film, comprising the step of forming a thin glass film containing ruthenium solidly dissolved therein as atoms on an insulator, by a pulsed laser deposition method using a target that contains an oxide of ruthenium; wherein a target containing glass is further used, in addition to the use of the target that contains the oxide of ruthenium.

18. The method of manufacturing a piezo-resistive film according to claim 17, wherein a target containing a fired glass body in which there are dispersed electrically conductive particles containing the oxide of ruthenium is used as the target that contains the oxide of ruthenium.

19. The method of manufacturing a piezo-resistive film according to claim 17, further comprising a step of annealing the thin glass film formed on the insulator at a temperature of 700° K or more.

* * * * *